(12) United States Patent
Bergacker

(10) Patent No.: US 6,425,201 B1
(45) Date of Patent: Jul. 30, 2002

(54) COLLAPSIBLE BAIT FISH TRAP

(76) Inventor: John W. Bergacker, 1009 NE. 104 St., Miami Shores, FL (US) 33138

( * ) Notice: Subject to any disclaimer, the term of this patent is extended or adjusted under 35 U.S.C. 154(b) by 4 days.

(21) Appl. No.: 09/684,915

(22) Filed: Oct. 10, 2000

(51) Int. Cl.[7] .............................................. A01K 69/10
(52) U.S. Cl. ................... 43/105; 43/100; 43/65
(58) Field of Search ..................... 43/100, 105, 55, 43/65

(56) References Cited

U.S. PATENT DOCUMENTS

| | | | | |
|---|---|---|---|---|
| 798,670 A | * | 9/1905 | Gee ................................ | 43/65 |
| 814,480 A | * | 3/1906 | Saffell ........................... | 43/100 |
| 897,589 A | * | 9/1908 | Connevey ....................... | 43/65 |
| 951,157 A | * | 3/1910 | Todd .............................. | 43/65 |
| 1,231,034 A | * | 6/1917 | Love .............................. | 43/100 |
| 1,269,623 A | * | 6/1918 | Logsdon ........................ | 43/65 |
| 1,407,744 A | * | 2/1922 | Flyklo ........................... | 43/105 |
| 1,445,763 A | * | 2/1923 | Gibbs ............................. | 43/100 |
| 2,076,972 A | * | 4/1937 | Tucker ........................... | 43/100 |
| 2,755,594 A | * | 7/1956 | Booth et al. ................... | 43/100 |
| 2,912,785 A | * | 11/1959 | Nudell ........................... | 43/100 |
| 2,935,811 A | * | 5/1960 | Hurtig ............................ | 43/105 |
| 3,077,695 A | * | 2/1963 | Winter ........................... | 43/105 |
| 3,099,890 A | * | 8/1963 | Madere .......................... | 43/100 |
| 3,271,894 A | * | 9/1966 | Manno et al. .................. | 43/100 |
| 3,786,593 A | * | 1/1974 | Gerbrandt ...................... | 43/100 |
| 3,800,464 A | * | 4/1974 | Parker ............................ | 43/100 |
| 3,916,558 A | * | 11/1975 | Crouch ........................... | 43/65 |

* cited by examiner

Primary Examiner—Kurt Rowan
(74) Attorney, Agent, or Firm—Michael W. York

(57) ABSTRACT

A collapsible bait fish trap for catching live bait fish in a body of water. The fish trap has an elongated hollow fish enclosure formed from two connected generally conical shaped portions. Each generally conical shaped portion has a connectable inner portion and an outer end portion having an inward extending funnel member portion with a funnel aperture for permitting the passage of bait fish for funneling or channeling bait fish into the interior of the elongated hollow fish enclosure. The outer end portions of the conical shaped portions have a series of apertures for allowing water to pass into the interior of the elongated hollow fish enclosure. The generally conical shaped portions can be disconnected and nestled together for transportation purposes or for storage purposes.

8 Claims, 3 Drawing Sheets

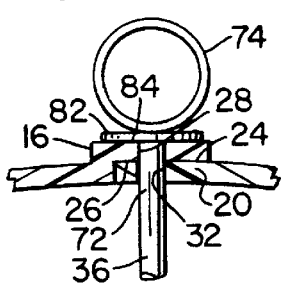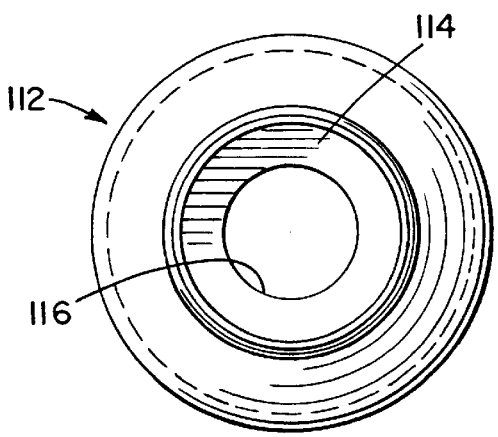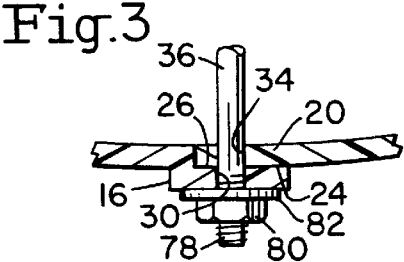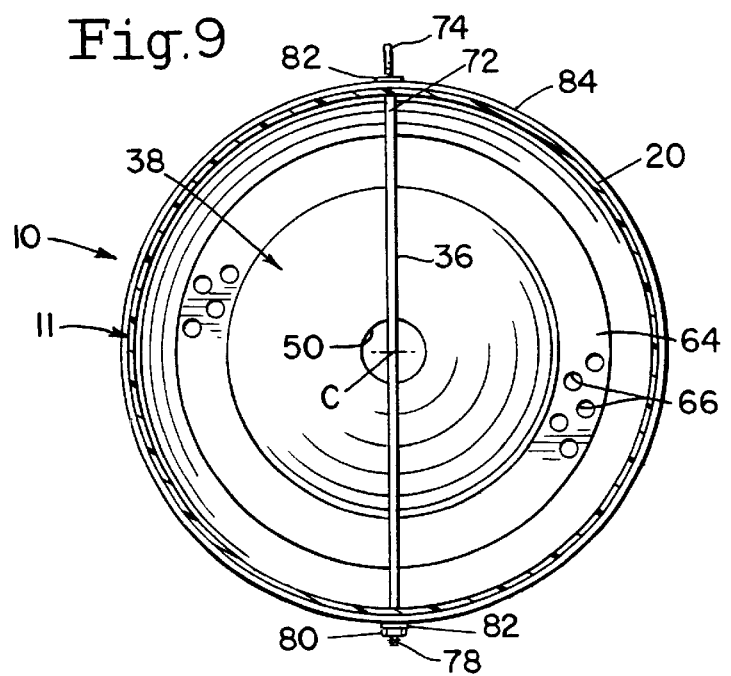

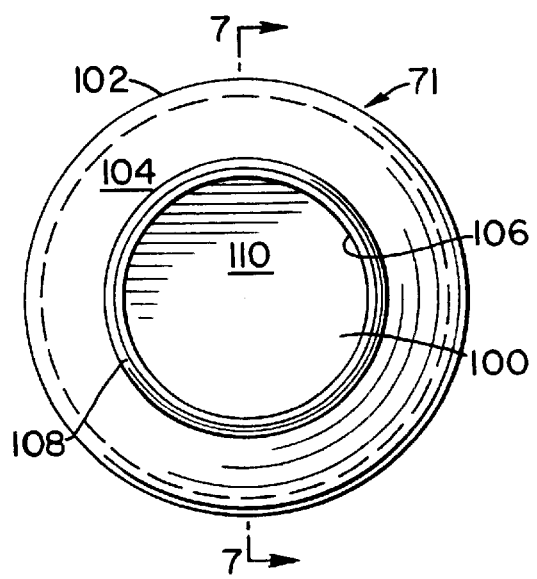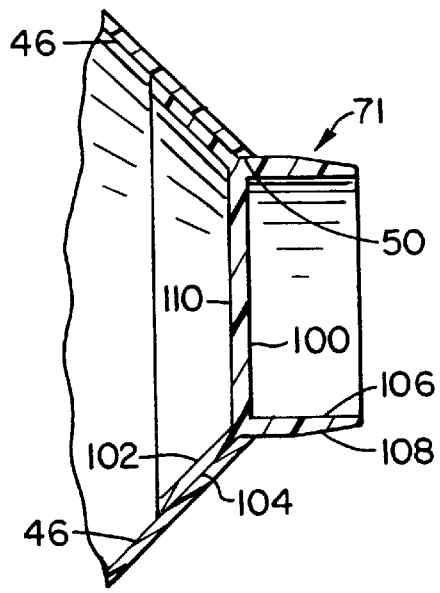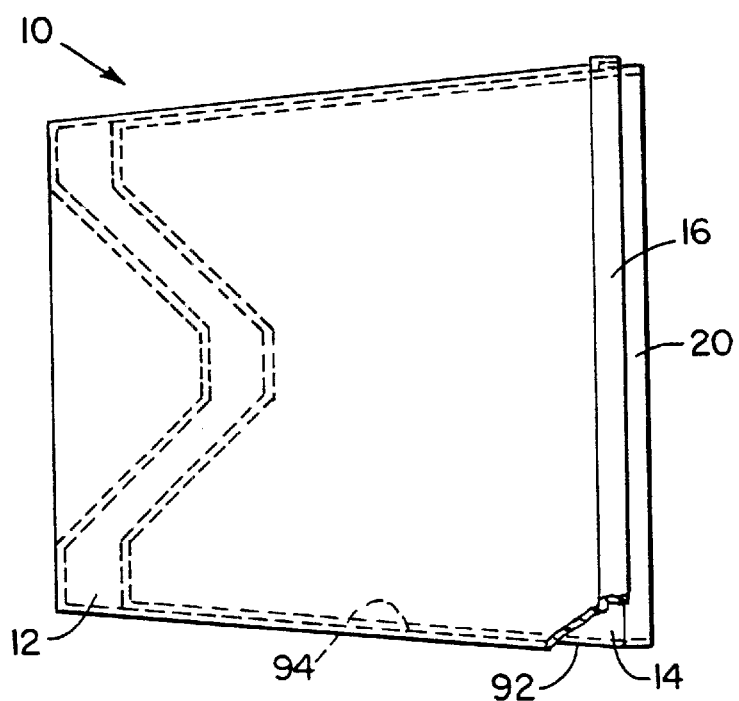

COLLAPSIBLE BAIT FISH TRAP

BACKGROUND OF THE INVENTION

Live small fish such as minnows are used to catch larger fish by putting them on a hook as bait for the larger fish. This type of bait has been used successfully for numerous years and it has proved to be excellent at attracting and catching fish. This is understandable since the bait fish is put on the hook in such a manner that it continues to stay alive for a period of time and to wiggle and attempt to swim and these movements and the blood from the bait fish attract larger fish. Obviously such live bait fish can not be reused since they are either eaten or die and hence lose their effectiveness. This means that there must be an adequate supply of live bait fish available to the fisherman at the the place where he is fishing.

Unfortunately, many fishing locations are in remote areas and far from an abundant supply of live bait fish. This situation makes it difficult to provide fisherman with the desired supply of live bait fish for the anticipated fishing. Fish are difficult to transport satisfactory since they require water at the right temperature and with the right oxygen concentration to survive and this increases both the bulk and the weight of the package or container that must be transported. Moreover, fish require special tanks to survive for any length of time and unless there is a steady market for bait fish a potential supplier will be reluctant to make the necessary investment to transport and supply bait fish.

This means that the fisherman, in many instances, must provide his own source of bait fish. Fortunately, most bodies of water contain at least some amount of bait fish and these bait fish can be trapped using a bait fish trap. Unfortunately, most bait fish traps have undesirable characteristics. Many are comparatively bulky and heavy and are hence they are difficult to transport particularly to the remote location where they are to be used.

Many bait fish traps are not entirely satisfactory in physically catching the bait fish and keeping them in the trap. Many bait fish traps do not readily attract bait fish into the trap and many of the traps allow bait fish that are physically in the trap to readily leave the trap. Consequently, the success rate of such bait fish traps is low. Another problem that current bait fish traps have is that they are not readily transportable by the fisherman to the fishing location because they are too bulky or too heavy. Most bait fish traps are not designed to be readily collapsible and hence they are comparatively bulky which restricts their transportability and hence their suitability for use in many remote fishing locations. In general, bait fish traps also lack flexibility in terms of being able to perform under different circumstances and this greatly reduces their flexibility and usefulness.

The collapsible bait fish trap invention overcomes these problems associated with previous bait fish traps and provides a bait fish trap that effectively draws bait fish into the trap and also has provisions for keeping the bait fish in the trap. The collapsible bait fish trap is compact and light weight and can easily be taken into remote locations. When the collapsible bait fish trap is collapsed it is roughly one half of its operational size which permits it to be stored in a boat, canoe, a light plane or even a back pack. The collapsible bait fish trap is designed for multiple uses so that it can be used effectively both in still water such as lakes and also in moving water such as in a river or a stream. In addition, the collapsible bait fish trap can also be used to store bait fish that have already been trapped.

SUMMARY OF THE INVENTION

This invention relates to fish traps and more particularly to fish traps for bait fish that are used by fishermen to catch larger fish.

Accordingly, it is an object of the invention to provide a bait fish trap that is collapsible.

It is an object of the invention to provide a collapsible bait fish trap for catching live bait fish in a body of water.

It is an object of the invention to provide a collapsible bait fish trap for catching live bait fish in a body of water that reliably traps bait fish.

It is an object of the invention to provide a collapsible bait fish trap for catching live bait fish in a body of water that reduces the chance of bait fish leaving the trap.

It is an object of the invention to provide a collapsible bait fish trap for catching live bait fish in a body of water that is flexible in its use.

It is an object of the invention to provide a collapsible bait fish trap for catching live bait fish in a body of water that can be configured for trapping bait fish in both still water such as a lake as well as in moving water such as a river or a stream.

It is an object of the invention to provide a collapsible bait fish trap for catching live bait fish in a body of water that is readily transported.

It is an object of the invention to provide a collapsible bait fish trap for catching live bait fish in a body of water that can be stored in a compact configuration.

It is an object of the invention to provide a collapsible bait fish trap for catching live bait fish in a body of water that has major portions that can be nestled together.

It is an object of the invention to provide a collapsible bait fish trap for catching live bait fish in a body of water that can be used where storage space is limited.

It is an object of the invention to provide a collapsible bait fish trap for catching live bait fish in a body of water that is easy to assemble.

It is an object of the invention to provide a collapsible bait fish trap for catching live bait fish in a body of water that has few parts.

It is an object of the invention to provide a collapsible bait fish trap for catching live bait fish in a body of water that is light in weight.

It is an object of the invention to provide a collapsible bait fish trap for catching live bait fish in a body of water that is resistant to breakage.

It is an object of the invention to provide a collapsible bait fish trap for catching live bait fish in a body of water that is primarily made from plastic.

It is an object of the invention to provide a collapsible bait fish trap for catching live bait fish in a body of water that is easy to locate or place in use and to retrieve.

It is an object of the invention to provide a collapsible bait fish trap for catching live bait fish in a body of water that is simple in its operation.

It is an object of the invention to provide a collapsible bait fish trap for catching live bait fish in a body of water that is less expensive to ship because it is collapsible.

It is an object of the invention to provide a collapsible bait fish trap for catching live bait fish in a body of water that can be configured for multipurpose uses.

It is an object of the invention to provide a collapsible bait fish trap for catching live bait fish in a body of water that is capable of being configured for use in storing live bait fish when it is not being used to catch bait fish.

These and other objects of the invention will be apparent from the following described collapsible bait fish trap for catching live bait fish in a body of water that includes an elongated hollow fish enclosure formed from two connected generally conical shaped portions with each generally conical shaped portion having a connectable inner portion and an outer end portion having an inward extending funnel member portion for funneling or channeling bait fish into the interior of the elongated hollow fish enclosure. Since the funnel extends inward or toward the center portion of the hollow fish enclosure it causes bait fish to swim into the center portion of the elongated hollow fish enclosure and since the surface of the funnel walls that face the interior of the hollow fish enclosure taper outward and away from the funnel exit hole they direct bait fish away from the funnel exit hole so that the bait fish remain trapped in the interior of the hollow fish enclosure. A rod member is also provided that is located in the interior of the elongated hollow fish enclosure so that it substantially intersects the long central axis of the hollow fish enclosure. This rod member diverts bait fish swimming along the long central axis of the hollow fish enclosure so that they remain trapped in the interior of the hollow fish enclosure.

BRIEF DESCRIPTION OF THE DRAWINGS

The invention will be hereinafter more fully described with reference to the accompanying drawings in which:

FIG. 2 is an enlarged view of the collapsible bait fish trap set forth in FIG. 1 taken within the circle 2 thereof;

FIG. 3 is an enlarged view of the collapsible bait fish trap set forth in FIG. 1 taken within the circle 3 thereof;

FIG. 6 is an enlarged end view of a plug for an opening in the collapsible bait fish trap;

FIG. 7 is a sectional view of the plug for an opening in the collapsible bait fish trap set forth in FIG. 6 taken in the direction of the line 7—7 thereof and also showing associated surrounding collapsible bait fish trap structure;

FIG. 8 is an enlarged end view of a hole reducing plug for an opening in the collapsible bait fish trap;

FIG. 9 is a sectional view of the collapsible bait fish trap set forth in FIG. 1 taken on the line 9—9 thereof; and FIG. 10 is a side elevational view of the collapsible bait fish trap invention in its storage or shipping configuration.

DETAILED DESCRIPTION OF THE PREFERRED EMBODIMENT

Figure 1:
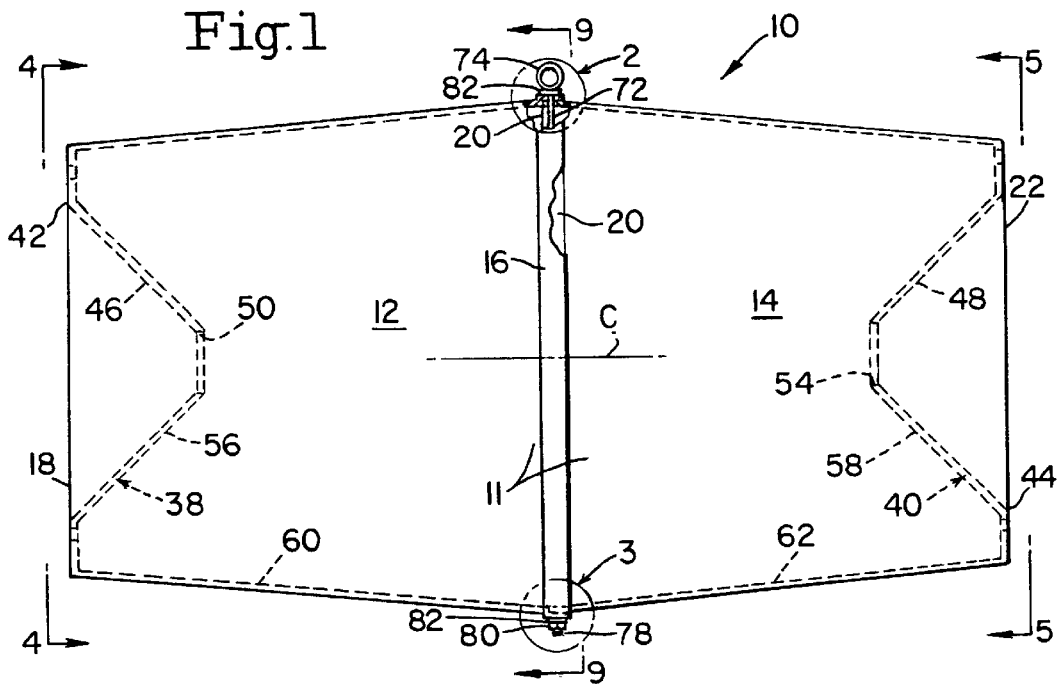
FIG. 1 is a side elevational view of the collapsible bait fish trap invention with portions thereof broken away for clarity.
Figure 4:
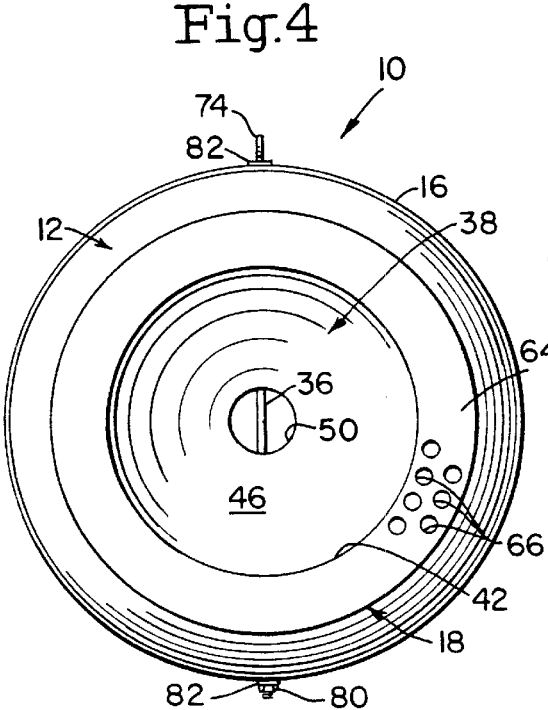
FIG. 4 is an end view of the collapsible bait fish trap set forth in FIG. 1 taken in the direction of the line 4—4 thereof.

The collapsible bait fish trap invention is illustrated in FIGS. 1, 2 and 3 and is designated generally by the number 10. The collapsible bait fish trap invention 10 comprises an elongated hollow bait fish enclosure 11 that is formed from two connected generally truncated hollow conical shaped portions 12 and 14 that are substantially similar in their construction and in their proportions. The conical shaped portion 12 has an enlarged ring shaped connecting end portion 16 and an oppositely located smaller funnel inlet end portion 18. In a similar manner the conical shaped portion 14 has an ring shaped connecting end portion 20 and an oppositely located smaller funnel inlet end portion 22. As illustrated in FIGS. 3 and 4, the outside surface 24 of the connecting end portion 20 of the conical shaped portion 14 is slightly less in diameter than the inside surface 26 of the connecting end portion 16 of the conical shaped portion 12. This permits the connecting end portion 20 to be inserted into the connecting end portion 16. The connecting end portions 16 and 20 have respective oppositely located holes 28 and 30 and 32 and 34 that extend completely through the connecting end portions 16 and 20. The conical shaped portions 12 and 14 are secured together by aligning the holes 28 and 32 and 30 and 34 and then passing a connecting rod member 36 through these holes 28, 32, 30 and 34.

As best illustrated in FIG. 1, the funnel inlet portions 18 and 22 of each conical shaped portion 12 and 14 have an inward extending conical funnel shaped portion designated respectively by the numbers 38 and 40. These funnel shaped portions 38 and 40 have outer large respective circular shaped openings 42 and 44 with respective inward tapering walls 46 and 48 that terminate in the respective smaller inner circular shaped openings 50 and 54. The funnel shaped portions 38 and 40 also have respective outer tapering walls 56 and 58 that taper outward from the respective circular shaped openings 50 and 54 toward the respective inner walls 60 and 62 of the respective conical shaped portions 12 and 14.

FIG. 4 illustrates an end elevational view of the collapsible bait fish trap 10 illustrated in FIG. 1 that is taken in the direction toward the funnel inlet end portion 18 of the conical shaped portion 12. As illustrated, there is a circular shaped flat ring portion 64 located adjacent to and surrounding the funnel shaped portion 38. This flat circular shaped ring portion 64 has a series of substantially identical holes 66, only some of which are shown, extending through it and into the hollow interior of collapsible bait fish trap 10.

Figure 5:
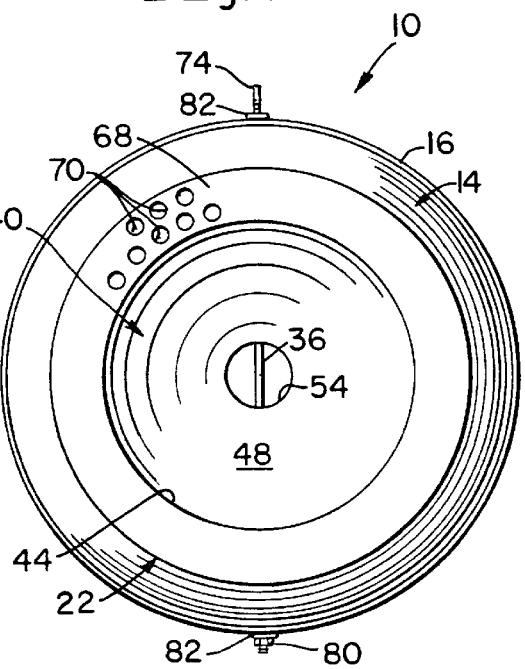
FIG. 5 is the opposite end view of the collapsible bait fish trap set forth in FIG. 1 taken in the direction of the line 5—5 thereof.

In a similar manner, FIG. 5 illustrates the end elevational view of the collapsible bait fish trap 10 illustrated in FIG. 1 but taken in the direction toward the funnel inlet end portion 22 of the conical shaped portion 14. As illustrated, there is a circular shaped flat ring portion 68 located adjacent to and surrounding the funnel shaped portion 40. This flat circular shaped ring portion 68 has a series of substantially identical holes 70, only some of which are shown, extending through it and into the hollow interior of the bait fish enclosure of the collapsible bait fish trap 10. These holes 70 are substantially the same size as the previously described holes 66 located in the funnel inlet end portion 18 of the conical shaped portion 12.

The collapsible bait fish trap 10 has two plugs 71 that are each sized and shaped to fit in the identically sized openings 50 and 54 of the funnel shaped portions 38 and 40 for closing off the openings 50 and 54 and FIGS. 6 and 7 illustrate the details of the construction of the plugs 71. As illustrated in FIGS. 6 and 7, the plug 71 has a centrally located cylindrical portion 100 that is surrounded by a circular thin skirt portion 102 that is formed at an angle so that the inner skirt surface 104 is sized and shaped to fit up against the adjacent tapering walls 46 and 48 that surround the circular shaped openings 50 or 54 to assist in sealing the opening 50 or 54 and also prevent the cylindrical portion 100 from being pushed through the opening 50 or 54 when the bait fish trap 10 is in use.

The cylindrical portion 100 has an opening 106 with a surrounding tapering lip portion 108 that is sized and shaped to be readily inserted into the opening 50 or 54 to assist in seating the plug 100 in the opening 50 or 54. The cylindrical portion 100 also has a solid circular web 110 that closes the end of the cylindrical plug 100 that is opposite the opening 106.

In FIG. 8 a different plug 112 is illustrated. This plug 112 is substantially identical to the plug 71, but the the plug 112 has a circular web 114 with a circular shaped opening 116 extending through it. This opening 116 is smaller in size than the opening 50 or 54 and hence when this plug 112 is inserted into the opening 50 or 54 it reduces the size of the opening 50 or 54, but it does not seal the opening 50 or 54. This plug 112 is useful in converting the collapsible bait fish trap 10 so that it will only catch smaller size bait fish.

FIG. 9 illustrates the important location of the connecting rod member 36. It will be noted that the connecting rod member 36 is located so that it intersects the center line C of the hollow interior of the collapsible bait fish trap 10 and hence it passes through the path from the circular opening 50 of one funnel shaped portion 38 to the other circular opening 54 of the other funnel shaped portion 40. As indicated in FIG. 6 and also in FIGS. 1 through 3 and 4 and 5, it will be noted that the top end portion 72 of the connecting rod member 36 has a ring 74 and that the end 78 that is opposite the end with the ring 74 is threaded. It will also be noted that a nut 80 is located on the threaded portion 78 and that washers 82 are located inside of the ring 74 and inside of the nut 80 on the connecting rod member 36 so that they press against the exterior surface 84 of the elongated hollow bait fish enclosure 11.

In FIG. 10 the bait fish trap invention 10 is illustrated in its collapsed compact or storage condition or shipping configuration and as illustrated the conical shaped portion 14 is inserted inside the conical shaped portion 12 which is made possible since the outside surface 92 of the conical shaped portion 14 is conical shaped and the inside surface 94 of the conical shaped portion 12 also has a conical shape.

The collapsible bait fish trap invention 10 is made and used in the following manner. The elongated hollow bait fish enclosure 11 that has the two conical shaped portions 12 and 14 is formed with the two portions 12 and 14 as one piece with the connecting end portions 16 and 20 of the respective conical shaped portions 12 and 14 connected together. This is accomplished using suitable plastic injection molding techniques known in the art. It should be noted that all of the various components and apertures of both conical shaped portions 12 and 14 are formed during this step so that subsequent machining of the conical shaped portions 12 and 14 is unnecessary. The conical shaped portions 12 and 14 are connected together after molding and at that time both the conical shaped portions 12 and 14 are identical and both have an enlarged ring shaped connecting end portion 16. Only one enlarged ring shaped connecting end portion 16 is needed and hence one connecting end portion 16 is cut away to produce the conical shaped portion 14 without the connecting end portion 16 and the conical shaped portion 12 with the connecting end portion 16.

The connecting rod member 36 and its associated hardware and the plugs 71 and 112 are also manufactured using conventional techniques known in the art. Since the outside surface 92 of the conical shaped portion 12 is conical and is sized to fit inside the inside conical surface 94 of the conical shaped portion 14 this permits the conical shaped portion 14 to be inserted inside the conical shaped portion 12. Normally, the collapsible bait fish trap 10 would be shipped in this condition with the conical shaped portion 14 inside the conical shaped portion 12.

The person using the collapsible bait fish trap 10 may leave it in this compact configuration with the conical shaped portion 14 inside the conical shaped portion 12 until the person has arrived at the location where the collapsible bait fish trap 10 is to be put into use. At this location, the conical shaped portion 14 is removed from inside the conical shaped portion 12. Then the connecting end portions 16 and 20 are secured together through the use of the connecting rod member 36 as previously described in connection with FIGS. 1, 2 and 3. A suitable line (not shown) is then secured to the ring 74 so that the collapsible bait fish trap 10 can be lowered into place in the water and then retrieved.

If the collapsible bait fish trap 10 is going to be used in a moving body of water such as a stream, then a plug 71 is placed in the circular shaped opening 50 or 54 of the funnel shaped portion 38 or 40. This plugged opening 50 or 54 is then be located upstream where the collapsible bait fish trap 10 is located to catch bait fish such as minnows. As previously indicated, when the collapsible bait fish trap 10 is in use without a plug 71, the connecting rod member 36 prevents the bait fish from just swimming along the centerline C and hence out of the hole 50 or 54 in the funnel shaped portions 38 or 40 of the collapsible bait fish trap 10. If the collapsible bait fish trap 10 is going to be used to hold or store bait fish for future use after they have been trapped, then both plugs 71 would be placed in both of the openings 50 and 54.

If the collapsible bait fish trap 10 is going to be used to catch only small bait fish, then a plug 112 with its small hole 116 is inserted into each opening 50 and 54 if the bait fish trap 10 is to be used in still water such as a lake. If the collapsible bait fish trap 10 is going to be used to catch only small bait fish in a moving body of water such as a stream, then a plug 112 with its small hole 116 is inserted into only one opening 50 or 54 and a regular plug 71 would be inserted into the other opening 50 or 54 to seal or close off that opening. The collapsible bait fish trap 10 would then be located in the moving body of water so that this sealed or closed off opening is located upstream.

Although the invention has been described in considerable detail with reference to a certain preferred embodiment, it will be understood that variations or modifications may be made within the spirit and scope of the invention as defined in the appended claims.

What is claimed is:

1. A collapsible bait fish trap for catching live bait fish in a body of water comprising: an elongated hollow fish enclosure formed from two generally tapering portions with each generally tapering portion having a circular shaped inner end portion having connecting means for reversibly connecting said generally tapering portions together and an outer end portion having channeling means; said connecting means comprising ring shaped connecting end portions located on the circular shaped inner end portions of said generally tapering portions with the ring shaped connecting end portions being sized and shaped to permit one ring shaped connecting end portion to be inserted into the other ring shaped connecting end portion, oppositely located holes extending through both ring shaped connecting end portions, and a connecting rod member sized to pass through the oppositely located holes in the ring shaped connecting end portions; said channeling means comprising a funnel shaped portion having an aperture leading into the interior of said elongated hollow fish enclosure for channeling bait fish into the interior of said elongated hollow fish enclosure; said generally tapering portions each having a circular shaped flat ring with a series of holes extending therethrough located adjacent to and surrounding the funnel shaped portion; and one of said generally tapering portions being sized and shaped to fit inside the other generally tapering portion for transportation or for storage purposes.

2. The collapsible bait fish trap of claim 1 wherein the holes in the ring shaped connecting end portions are substantially identical.

3. The collapsible bait fish trap of claim 1 further comprising a removable plug for sealing the aperture in said funnel shaped portions and wherein said removable plug has a centrally located portion surrounded by a circular skirt portion.

4. The collapsible bait fish trap of claim 3 wherein said plug has means for assisting said plug to be readily inserted into the apertures in said funnel shaped portions.

5. The collapsible bait fish trap of claim 4 wherein said means for assisting said plug to be readily inserted into the apertures in said funnel shaped portions comprises a tapering lip portion located on the centrally located portion of said plug.

6. The collapsible bait fish trap of claim 1 further comprising means for converting said collapsible bait fish trap to catch small bait fish.

7. The collapsible bait fish trap of claim 6 wherein said means for converting said collapsible bait fish trap to catch small bait fish comprises a plug with an aperture extending therethrough.

8. The collapsible bait fish trap of claim 1 wherein said connecting rod member has two end portions and wherein said a connecting rod member has a ring located on one of the two end portions.

* * * * *